US008849451B2

(12) United States Patent
Rizzi et al.

(10) Patent No.: US 8,849,451 B2
(45) Date of Patent: Sep. 30, 2014

(54) HOPPING ROBOT

(75) Inventors: Alfred Anthony Rizzi, Belmont, MA (US); Michael Patrick Murphy, Cambridge, MA (US); John Joseph Giarratana, Whitman, MA (US); Matthew David Malchano, Somervill, MA (US); Christian Allen Weagle, Malden, MA (US); Chris Aaron Richburg, Somerville, MA (US)

(73) Assignee: Boston Dynamics, Inc., Waltham, MA (US)

( * ) Notice: Subject to any disclaimer, the term of this patent is extended or adjusted under 35 U.S.C. 154(b) by 753 days.

(21) Appl. No.: 13/066,276

(22) Filed: Apr. 11, 2011

(65) Prior Publication Data

US 2012/0259460 A1    Oct. 11, 2012

(51) Int. Cl.
 G06F 19/00 (2011.01)
 B62D 57/00 (2006.01)
 A63H 17/00 (2006.01)
 B62D 57/028 (2006.01)
 B60B 15/02 (2006.01)
 B60B 15/08 (2006.01)

(52) U.S. Cl.
 CPC ............ B62D 57/028 (2013.01); B60B 15/02 (2013.01); B60B 15/08 (2013.01); Y10S 901/01 (2013.01)
 USPC ................. 700/245; 901/1; 180/7.1; 446/431

(58) Field of Classification Search
 USPC ............. 123/46 R, 46 SC, 46 H; 180/7.2–10; 700/245–264; 701/69, 116, 124; 901/1, 901/46, 48, 50; 318/568.1–568.25
 See application file for complete search history.

(56) References Cited

U.S. PATENT DOCUMENTS

| 2,158,180 | A | 5/1939 | Goddard |
| 6,247,546 | B1 | 6/2001 | Spletzer et al. |
| 6,328,002 | B1 | 12/2001 | Spletzer et al. |
| 7,263,955 | B1 | 9/2007 | Fischer |
| 7,650,919 | B2 | 1/2010 | Rhyne et al. |
| 7,775,305 | B1 | 8/2010 | Fischer |
| 2007/0267116 | A1 | 11/2007 | Rhyne et al. |
| 2008/0230285 | A1* | 9/2008 | Bewley et al. .......... 180/8.4 |
| 2009/0283185 | A1 | 11/2009 | Manesh et al. |
| 2010/0078111 | A1 | 4/2010 | Anderson et al. |
| 2010/0200131 | A1 | 8/2010 | Iwase et al. |

OTHER PUBLICATIONS

Lambrecht et al, "A Small, Insect-Inspired Robot that Runs and Jumps", Proceedings of 2005 IEEE International Conference on Robotics and Automation, pp. 1240-1245.*
NASA, "Flight Path and Orientation Control", Mar. 18, 2010, courtesy of Internet Wayback Archive.*

(Continued)

*Primary Examiner* — Khoi Tran
*Assistant Examiner* — Abby Lin
(74) *Attorney, Agent, or Firm* — McDonnell Boehnen Hulbert & Berghoff LLP

(57) ABSTRACT

A robot includes a chassis, a motive subsystem configured to maneuver the chassis, a hopping actuator attached to the chassis and configured to launch the robot, and at least one leg pivotable with respect to the chassis to pitch the chassis upward at a selected launch trajectory angle. A control subsystem automatically actuates and controls the motive subsystem when the robot is airborne and uses the rotational momentum of the motive subsystem to control the attitude of the robot chassis in flight.

44 Claims, 9 Drawing Sheets

(56) References Cited

OTHER PUBLICATIONS

Gary Fischer, "Wheeled Hopping Mobility", Unmanned/Unattended Sensors and Sensor Networks II, SPIE vol. 5986, 2005.*

German, John, "Hop to it: Sandia hoppers leapfrog conventional wisdom about robot mobility", vol. 52, No. 21, Oct. 20, 2000, Sandia Lab News, Albuquerque, New Mexico. (http://www.sandia.gov/LabNews/LN10-20-00/hop_story.html).

U.S. Appl. No. 13/624,006, filed Sep. 21, 2012, Saunders et al.

Salton et al. and Rizzi et al., "Urban Hopper", Apr. 2010, 9 pgs. (unnumbered).

* cited by examiner

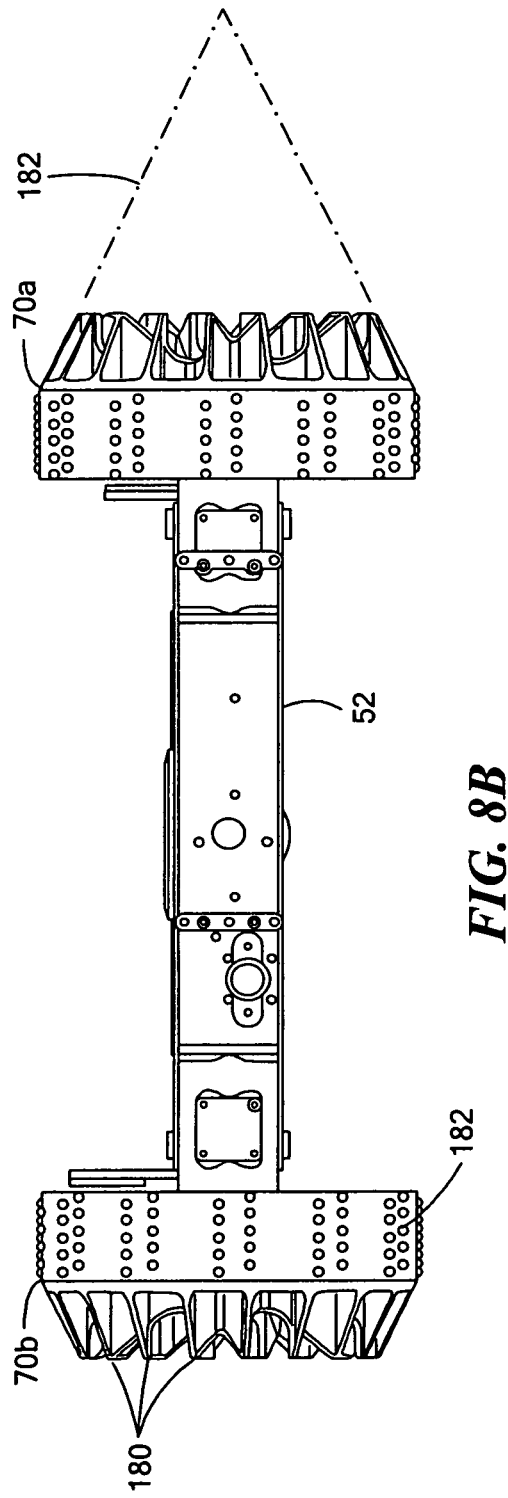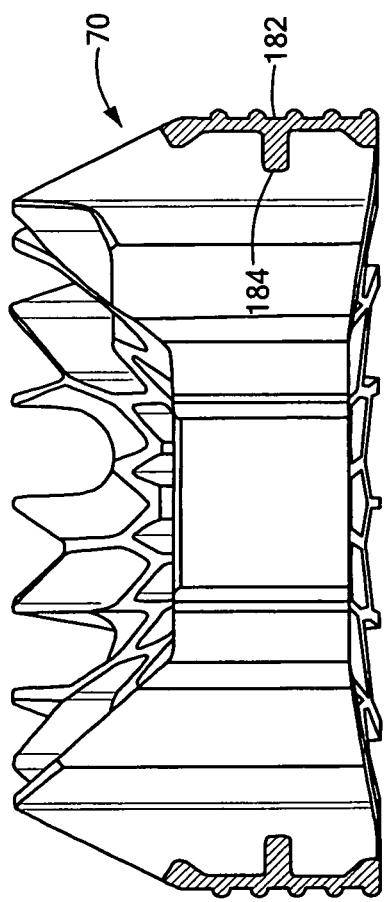
FIG. 8B
FIG. 9

HOPPING ROBOT

GOVERNMENT RIGHTS

This invention was made with U.S. Government support under Contract No. 878424 awarded by Sandia National Laboratories (SNL). The Government has certain rights in the invention.

FIELD OF THE INVENTION

This invention relates, in one preferred embodiment, to hopping robots.

BACKGROUND OF THE INVENTION

Remotely controlled mobile robots can be limited in mobility by various obstacles including stairs, fences, walls, and the like. Thus, there is a need for enhanced mobility robots. U.S. Pat. No. 7,775,305, incorporated here by this reference, discloses a wheeled robot with a combustion powered linear actuator which launches the robot into the air—over a fence, for example.

One problem with the design of this robot includes an actuator which must be rotated into a deployment position and then rotated back again for storage. Also, the robot can tumble uncontrollably in flight causing damage upon landing to components of the robot and/or the actuator. Furthermore, upon landing, the robot can bounce again causing damage and/or uncontrollable motion of the robot.

SUMMARY OF THE INVENTION

It is therefore an object of the invention, in one particular embodiment, to provide a robot which is able to hop over fences and walls, onto and off of a building roof, over ditches, over stairs, and the like without undue damage to the robot or its components and in a more controlled fashion.

The subject invention results from the at least partial realization that, in one preferred embodiment, a more advanced robot with hopping functionality includes a fixed actuator, launch legs which elevate the front of the robot prior to flight of the robot, functionality which levels the robot in flight, and/or a chassis design wherein the robot's median axis of inertia is perpendicular to the pitch axis.

The subject invention, however, in other embodiments, need not achieve all these objectives and the claims hereof should not be limited to structures or methods capable of achieving these objectives.

A robot in accordance with one example includes a chassis, a motive subsystem configured to maneuver the chassis, a hopping actuator attached to the chassis and configured to launch the robot, and at least one leg pivotable with respect to the chassis to pitch the chassis upward at a selected launch trajectory angle.

Preferably, the hopping actuator is a linear actuator such as a combustion powered linear actuator fixed to the chassis and with a foot extending rearwardly of the robot chassis producing a thrust vector through or nearly through the center of mass of the chassis.

There can be a plurality of legs such as two legs, one on each opposing side of the chassis extending alongside the chassis and pivotable downward. A drive subsystem for each leg pivots the legs with respect to the chassis.

Preferably, a control subsystem (typically including a controller, processor, or the like) is configured to automatically actuate the motive subsystem when the robot is airborne. A sensor such as an accelerometer can be used to determine when the robot is airborne and the control subsystem is configured to actuate the motive subsystem in response. The control subsystem can be further configured to control the motive subsystem when the robot is airborne. In one embodiment, a measurement subsystem detects the orientation of the robot chassis in flight and the control subsystem controls the motive subsystem as a function of the orientation. For example, the control subsystem may be configured to apply torque to the motive system in order to cause the robot chassis to rotate towards a desired pitch orientation.

One preferred chassis defines a pitch axis and a roll axis and the chassis is configured to have a median axis of inertia transverse to the pitch axis. The motive subsystem may include wheels and then it is preferred that each wheel includes outwardly extending, inwardly angled protrusions for absorbing energy. The wheels are made of an energy absorbing material formed into a rim supported by cells. The wheels can be configured to have an increased moment of inertia, for example, by including a rim with an inwardly extending ridge.

The invention also features a robot comprising a chassis, a motive subsystem configured to maneuver the chassis, a measurement subsystem for detecting the attitude of the robot in flight, and a control subsystem configured to automatically actuate and control the motive subsystem when the robot is airborne and use the rotational inertia of the motive subsystem to control the attitude of robot chassis in flight. In one design, a hopping actuator is attached to the chassis and configured to launch the robot. Also, at least one mechanism may be included to selectively pitch the chassis upwards at a select launch trajectory angle before launch.

One robot deployment method in accordance with the invention includes maneuvering the robot to a launch location by driving a robot motive subsystem, elevating one side of the robot, and launching the robot by activating a hopping actuator. The method can further include automatically controlling the attitude of the robot in flight using the rotational momentum of the robot motive subsystem, automatically leveling the robot in flight and adjusting the orientation of the robot in flight. One method further includes the step of configuring the robot chassis to have a median axis of inertia transverse to a chassis pitch axis.

Another robot deployment method includes maneuvering the robot to a launch location by driving a robot motive subsystem, launching the robot, and controlling the attitude of the robot in flight using rotational momentum of the motive subsystem. In one version, one side of the robot is elevated prior to launching the robot and launching the robot includes activating a hopping actuator.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 8B is a schematic front view of the robot shown in FIG. 8A; and

FIG. 9 is a schematic cross sectional view of one of the robot wheels shown in FIGS. 8A-8B.

DETAILED DESCRIPTION OF THE INVENTION

Figure 1:
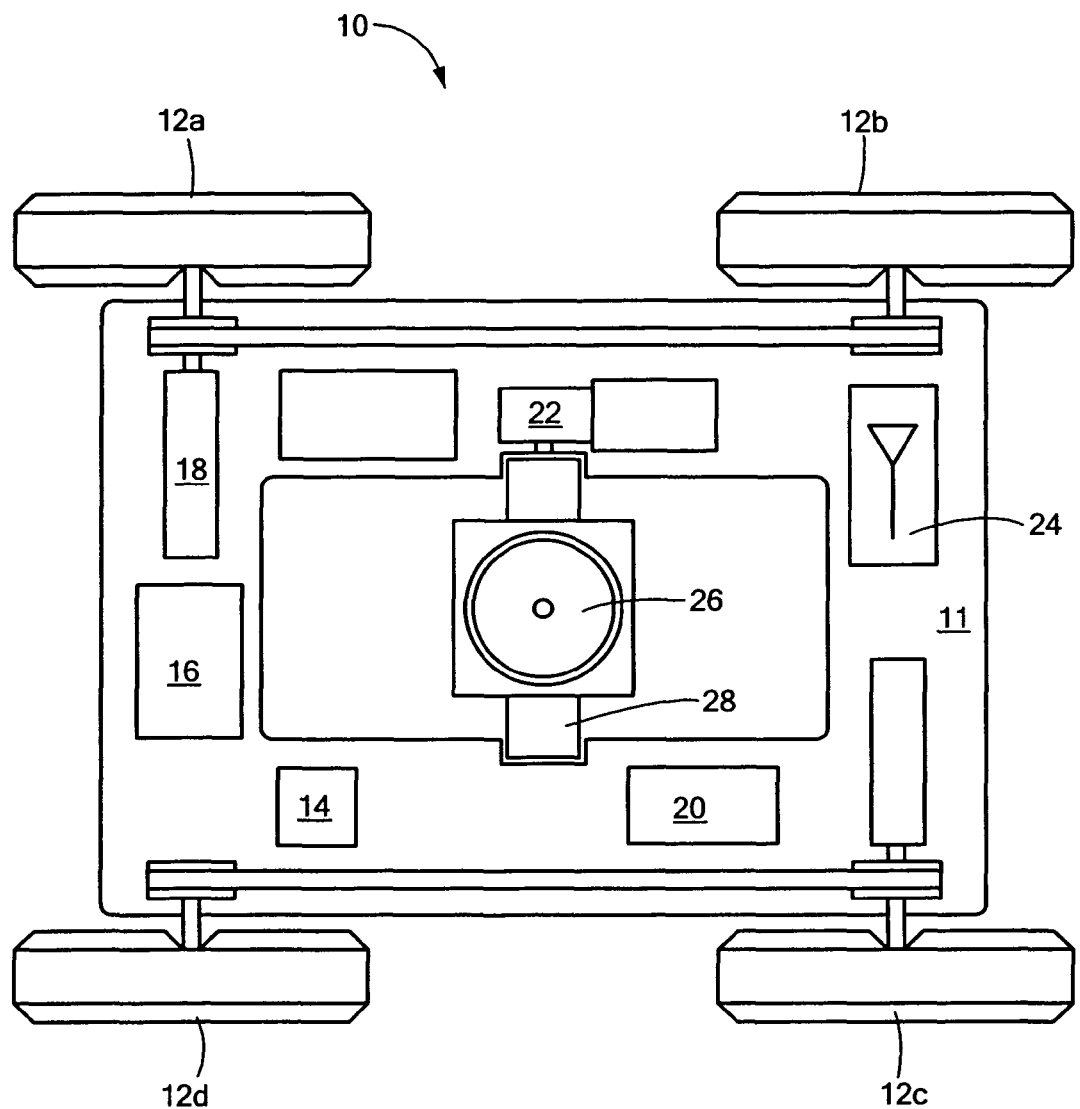
FIG. 1 is a schematic bottom view of a prior art wheeled hopping robot in accordance with U.S. Pat. No. 7,775,305.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
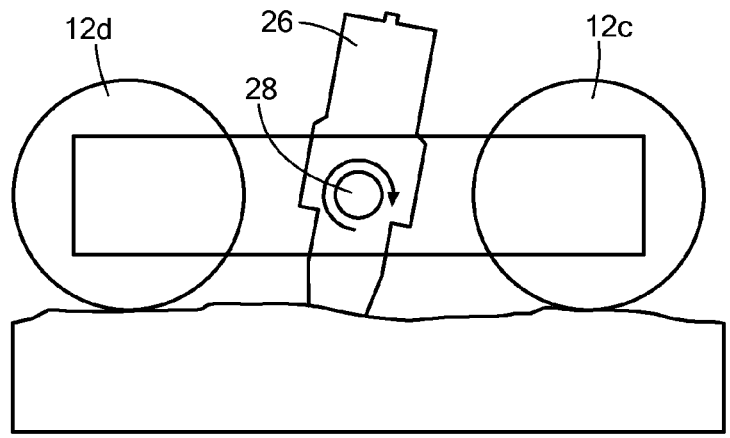
FIG. 2 is a schematic side depiction of the wheeled hopping robot shown in FIG. 1 with the actuator in the launch position.
Figure 3:
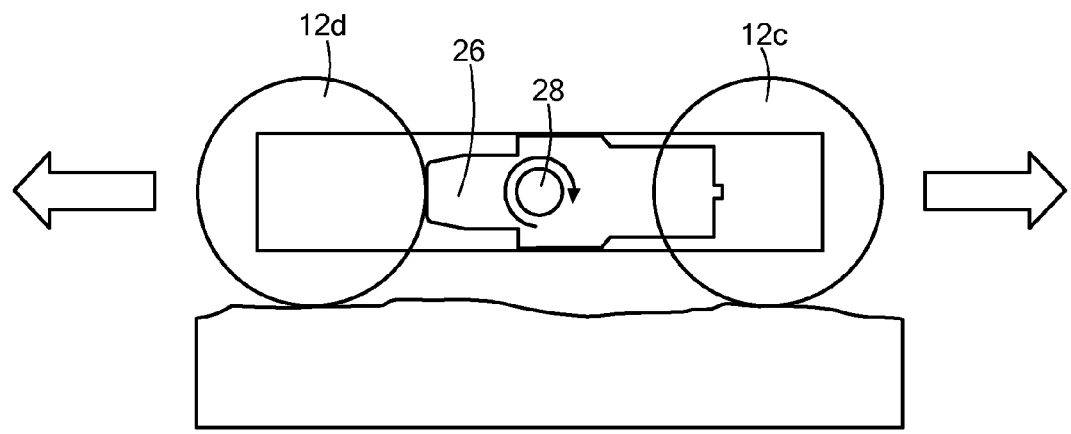
FIG. 3 is a schematic side depiction of the robot shown in FIG. 1 with the actuator shown in the stored position.

FIG. 1 shows wheeled hopping robot 10 of U.S. Pat. No. 7,775,305 including motor (18) driven wheels 12a-12d on chassis 11 wherein actuator 26 is coupled to chassis 11 via rotatoble mount 28. Fuel for actuator 26 can be stored in tank 20 carried by chassis 11. Control of the robot and communications between the robot and a control station or hand held control device can be accomplished by incorporating transceiver 24 and associated controls (not shown). A processor (e.g., micro-processor, computer, logic device, or the like) can be carried by the robot and can be coupled to the transceiver to provide the control and communication functions for operating the robot. Power for components comprising the robot can be stored in on-board batteries 14. Servo motor 22 can be used to rotate actuator 26 via rotatable mount 28 to the position shown in the FIG. 2 whereupon the actuator is activated and the robot is launched into the air. While the wheeled robot is traversing terrain via wheels 12a-12b as shown in FIG. 3, actuator 26 is pivoted into a stowage position with respect to the chassis.

As discussed in the Background section above, problems with such a design include the complexity associated with the actuator which must be rotated into a deployment position and then rotated again for storage. Also this robot tumbles uncontrollably in flight which can cause damage upon landing to components of the robot and/or the actuator. Furthermore, upon landing, the robot can bounce causing damage and/or uncontrolled motion.

Figure 4A:
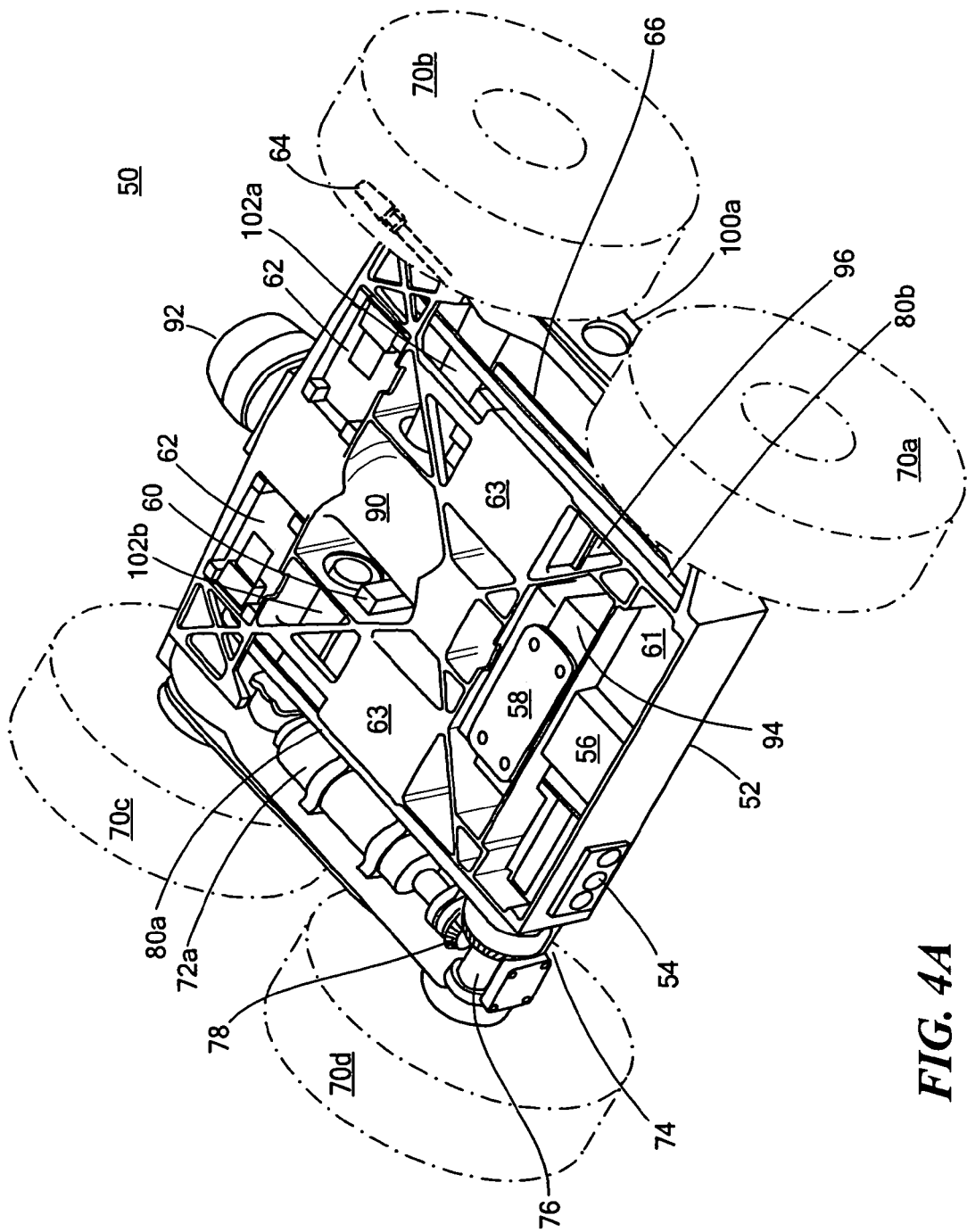
FIG. 4A is a schematic three dimensional top view showing the primary components associated with one example of a robot in accordance with the invention.
Figure 4B:
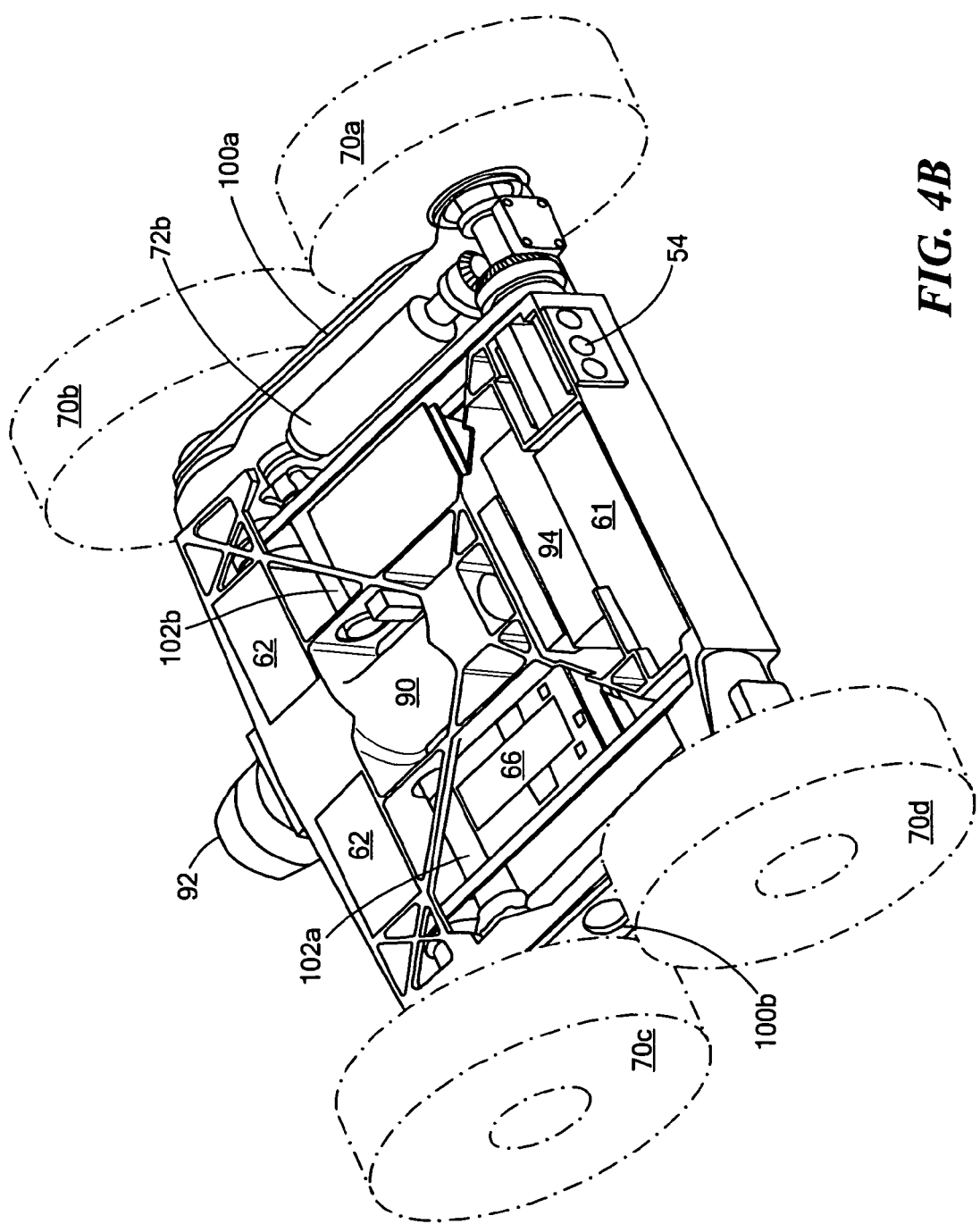
FIG. 4B is a schematic three dimensional bottom view of the robot shown in FIG. 4A.

A robot 50, FIG. 4A in accordance with one particular example of the subject invention is able to hop over fences and walls, onto and off of a building roof, over ditches, over stairs, and the like without undue damage to the robot or its components and in a more controlled fashion. Robot 50 FIGS. 4A-4B typically includes chassis 52 housing the various components of the robot such as video camera 54, inertial measurement unit 56, GPS subsystem 58, accelerometer 60, battery pack 62, and 802.11 antenna 64. Radio 66 (for remote control and for transmitting video signals and the like), control computer 61, and power electronics 63 are also typically present as are other subsystems known in the art. The chassis also supports some form of a motive subsystem. In this particular embodiment, the motive subsystem includes wheels 70a-70d driven by motors 72a and 72b and including a drive train such as a gear box, slip clutch 74, floating drive shaft 76, bevel gear 78, drive belts 80a and 80b, and the like. The motive subsystem and the drive subsystem may vary in design. In one embodiment, for example, tracks may be used. When front and rear drive shafts are employed, a belt may couple the two shafts.

Hopping actuator 90 for launching the robot is also supported by chassis 52 and in this design actuator 90 is fixed centrally as shown within the chassis and extends readwardly terminating in actuatable foot 92. Actuator 90 is preferably a combustion powered linear actuator as disclosed in U.S. Pat. No. 7,775,305 incorporated herein by this reference. Fuel tank 94, fuel pressure sensor 96, a glow plug, and the like are preferably associated with actuator 92.

Figure 5:
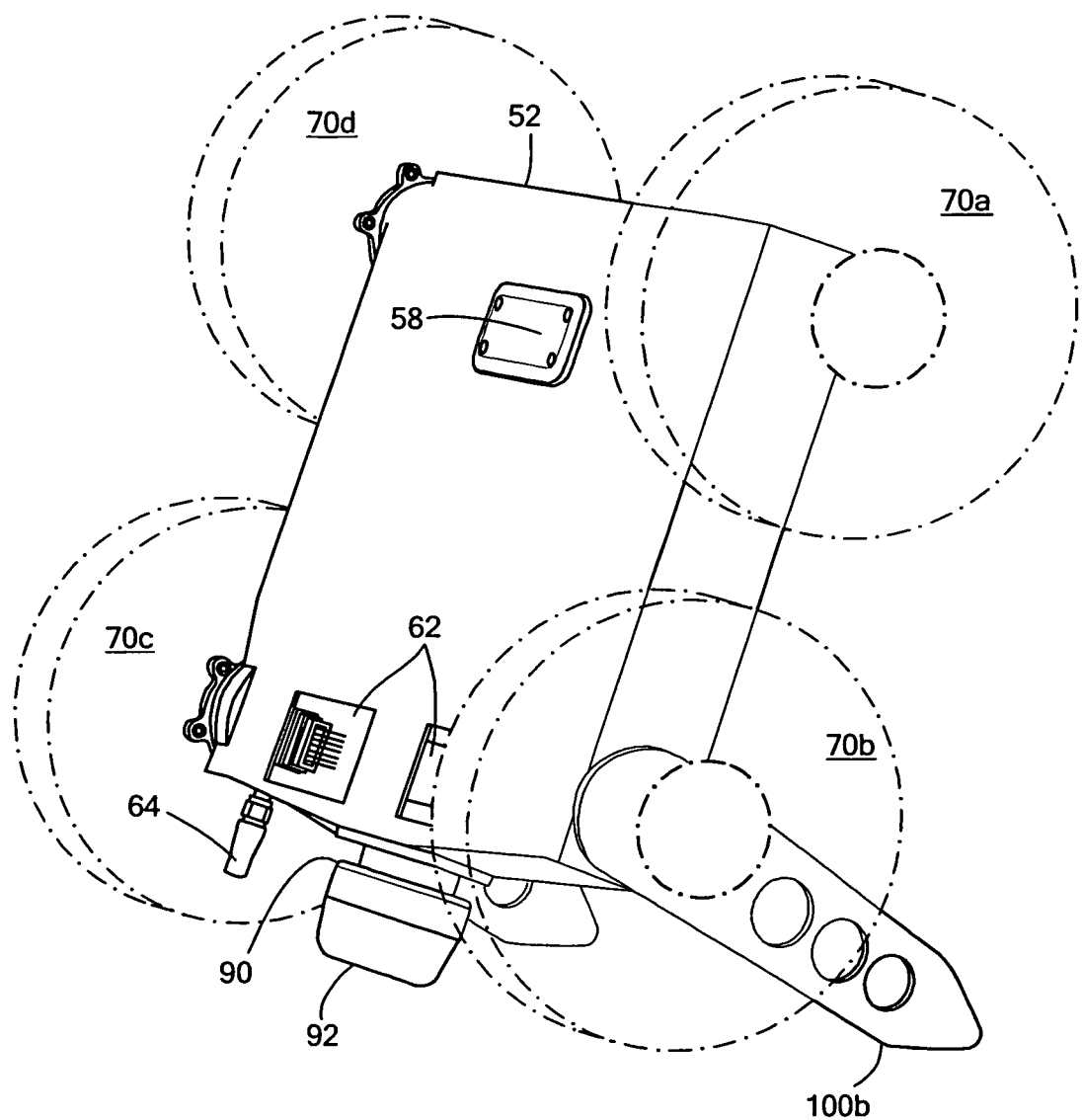
FIG. 5 is a schematic three dimensional side view of the robot shown in FIGS. 4A and 4B with the launch legs in the deployed position.

Legs 100a and 100b as more clearly shown in FIG. 5 are pivotable with respect to chassis 52 in order to pitch the chassis upward at a selected launch trajectory angle. Legs 100a and 100b are driven by motors 102a and 102b, respectively, FIGS. 4A and 4B. Typically, each motor drives a launch leg via a drive subsystem including a gearbox, coupler, spur gear, and slip clutch. The legs are preferably driven down to pitch the chassis up and then, in flight, the legs are pivoted up to stow them.

As shown, the chassis 52 is square or rectangular and thin and all the components are protected by wheels 70a-70d. The robot can traverse terrain right-side up or upside down. Features of the invention in this particular embodiment include actuator 90 being fixed relative to the robot chassis eliminating backlash and flexibility during the launch event. This configuration leads to a more stable launch because the thrust vector can more nearly be located to act through the center of mass of the chassis. The launch legs shown in their deployed position in FIG. 5 allow the chassis to be pointed in a large range of launch postures or angles (typically by the operator). Foot 92 of actuator 90 can be stowed quickly after launch because foot 92 only needs to be retracted; not rotated. The chassis is also designed so that the pitch axis corresponds to the minimum principle moment of inertia so that any rotation during flight remains primarily pitch motion and does not couple in an unstable way to roll or yaw motion. Such a design dramatically reduces any uncontrolled tumbling during flight by avoiding rotation about the intermediate inertial axis during launch. All motion of the chassis preferably ends up being end over end tumbling which can be controlled. Wheels 70a-70b as discussed below are also used as control moment gyros during flight to counteract any vehicle pitch rotation. Wheels 70a-70d are further designed to maximally absorb energy upon landing of the robot. In this preferred design, robot chassis 52 is designed to have a center of mass and an orientation of actuator 90 such that foot 92 produces a thrust through or nearly through the center of mass of chassis 52.

Figure 6:
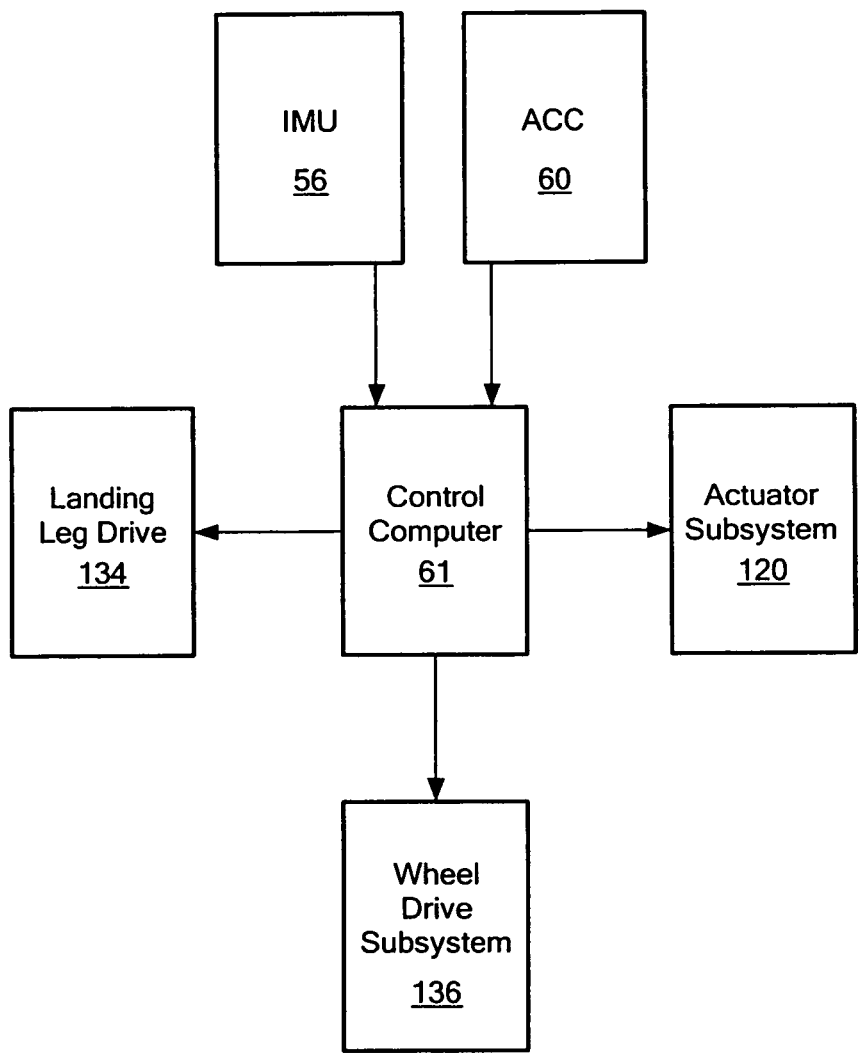
FIG. 6 is a block diagram depicting several of the primary subsystems associated with an example of a robot in accordance with the invention.
Figure 7:
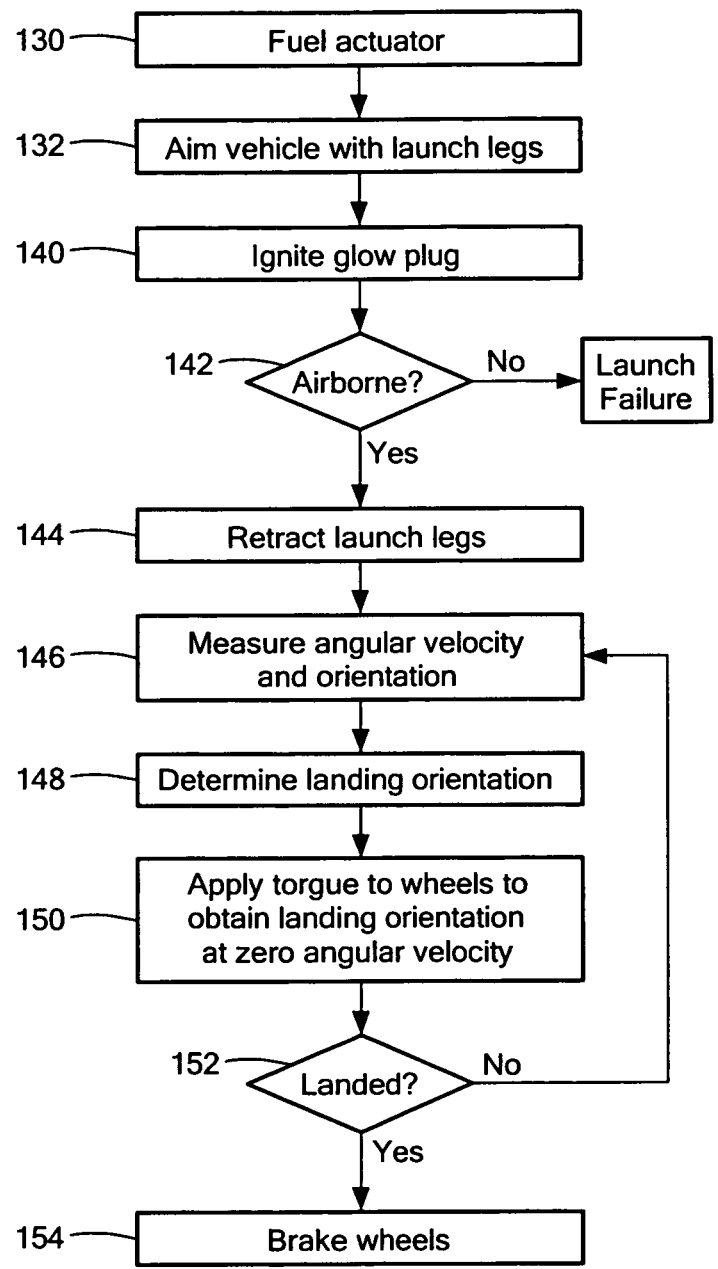
FIG. 7 is a flow chart depicting the primary steps associated with controlling a robot in accordance with one preferred method of the invention and also depicting how the control computer of FIG. 6 is programmed.

Control computer 61, FIG. 6 is configured (for example programmed), in response to a launch command, to activate the hopping actuator subsystem 120 which typically means initially providing fuel to the actuator, step 130, FIG. 7. The vehicle chassis is then aimed using the launch legs, step 132 (see FIG. 6 where control computer 61 controls the launch leg drive subsystem 134). In step 140, FIG. 7, the control computer provides signals which causes the ignition of a glow plug which ignites the fuel of the hopping actuator to propel the robot into the air. Control computer 61, FIG. 6 detects a launch event based on acceleration information provided by accelerometer 60, step 142, FIG. 7. Control computer 61, FIG. 6 then controls the launch leg drive subsystem 134 to retract the launch legs, step 144, FIG. 7.

The automatic control loop shown in FIG. 7 is also initiated. The angular velocity and orientation of the robot chassis are measured, step 146 by control computer 61 using the information from inertial measurement unit 56, FIG. 6. The robot chassis angular velocity and orientation are measured in order for control computer 61 to determine a desired landing orientation either right-side up or upside down. The overall goal in this particular embodiment is to detect the attitude of the robot in flight and control the attitude of the robot chassis to level the chassis.

Accordingly, control computer 61 controls wheel drive subsystem 136, FIG. 6 in one example to cause the wheels to rotate forward or backward until the robot chassis is level in flight. In other words, the rotational momentum of the robot motive subsystem is controlled in order to control the attitude of the robot chassis in flight.

Control computer 61 applies torque to the robot wheels in order to cause the robot body to rotate towards the desired landing orientation and to cause the magnitude of the chassis' angular velocity to approach zero as the chassis orientation approaches this desired landing orientation, steps 148 and 150, FIG. 7. See U.S. Pat. No. 2,158,180 incorporated herein by this reference. Assuming the wheels are not spinning, then driving the driving the wheels forward will pitch the chassis up and driving the wheels backwards will pitch the chassis down. In general, the direction and/or speed of the wheels can be used to control the pitch of the chassis.

At step 152, control computer 61, FIG. 6 monitors the output of accelerometer 60 to determine if the robot is still airborne or instead has landed. If the robot is still airborne, the control loop of steps 146, 148 and 150, FIG. 7 continues. Again, the overall goal is to keep the robot chassis level. If the robot has landed at step 152, control computer 61 controls wheel drive subsystem 136, FIG. 6 to apply a braking force to the robot wheels, step 154, FIG. 7. Once the wheel rotation has stopped, control computer 61, FIG. 6 returns to being remotely driven by an operator typically using a hand held operator control subsystem, controller, or the like.

The ability to level the robot chassis and keep it level by controlling the drive wheels or whatever propels the robot on the ground and their direction prevents the robot from tumbling and becoming damaged as was the case with the prior art. Indeed, in embodiments where a hopping actuator is not present, the ability to control the robot in flight can still be important in examples like where the robot is thrown or driven off a ledge, and the like.

Figure 8A:
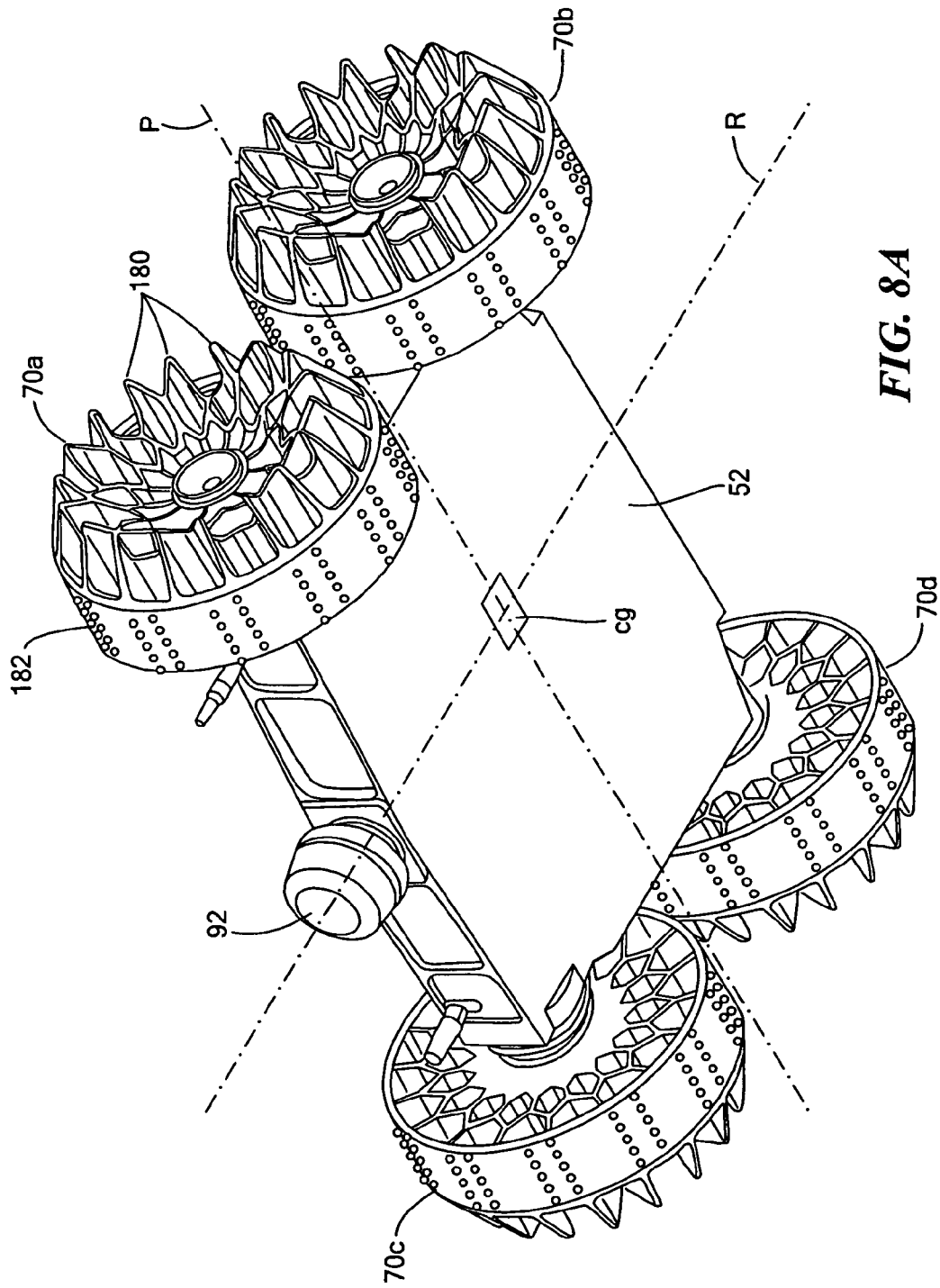
FIG. 8A is a schematic three dimensional rear view of an example of a robot in accordance with the invention.

In one preferred version as shown in FIGS. 8A and 8B, each wheel 70 includes protrusions 180 extending outwardly therefrom for absorbing energy upon landing and preferably the protrusions are angled inwardly as shown at 182 in FIG. 8B. This design helps ensure that if the robot chassis does land on its side then it will fall to an either a right-side up or upside down orientation. Each wheel is preferably made of an energy absorbing material that converts better than 90% of deformation energy into heat by using a cellular structure for the material as shown made of a high hysteresis polyurethane material. Each wheel can be configured to include an increased moment of inertia by the addition of rim 182 with inwardly extending ridge 184, FIG. 9. Examples of suitable materials and wheel designs are disclosed in U.S. Patent Publication No. 2009/0283185 incorporated herein by this reference.

As noted above, the robot and its components are configured such that chassis 52, FIGS. 8A-8B, has a pitch axis P and a roll axis R and a median axis of inertia transverse to pitch axis P (typically, coextensive with roll axis R). Also, actuator foot 92 produces a thrust vector through or very nearly through the center of mass of the chassis typically in the direction of roll axis R as shown. These features help ensure stability in flight and also help ensure that all motions of the robot chassis turn into end over end tumbling of the robot chassis which can be controlled by activating the wheel drive subsystem as described above.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A robot comprising:
   a chassis;
   a motive subsystem configured to maneuver the chassis;
   a hopping actuator attached to the chassis and configured to launch the robot, wherein the hopping actuator includes a foot extending rearwardly from the chassis along a roll axis of the chassis, and wherein the foot produces a thrust vector in a direction of the roll axis of the chassis; and
   at least one leg pivotable with respect to the chassis to pitch the chassis upward at a selected launch trajectory angle, wherein the at least one leg is separate from the foot.

2. The robot of claim 1 in which the hopping actuator is a linear actuator.

3. The robot of claim 2 in which the hopping actuator is a combustion powered linear actuator.

4. The robot of claim 1 in which the hopping actuator is fixed to the chassis.

5. The robot of claim 1 in which there are a plurality of said legs.

6. The robot of claim 5 in which there are at least two legs, one on each opposing side of the chassis extending alongside the chassis and pivotable downward.

7. The robot of claim 1 further including a drive subsystem for said leg to pivot said leg with respect to the chassis.

8. The robot of claim 1 further including a control subsystem configured to control the motive subsystem when the robot is airborne.

9. The robot of claim 8 further including a sensor for determining when the robot is airborne and the control subsystem is responsive to said sensor and configured to actuate the motive subsystem in response.

10. The robot of claim 9 in which said sensor is an accelerometer.

11. The robot of claim 8 in which the control subsystem is further configured to automatically actuate the motive subsystem when the robot is airborne.

12. The robot of claim 11 in which the robot further includes a measurement subsystem which detects the orientation of the robot chassis in flight and the control subsystem controls the motive subsystem as a function of the orientation.

13. The robot of claim 12 in which the control subsystem is configured to drive the motive system until the robot chassis is level in flight.

14. The robot of claim 12 in which the control subsystem is configured to drive the motive subsystem in order to cancel pitch rotation of the chassis.

15. The robot of claim 1 in which the chassis defines a pitch axis and the chassis is configured to have a median axis of inertia transverse to the pitch axis.

16. The robot of claim 1 in which the motive subsystem includes wheels.

17. The robot of claim 16 in which each wheel includes protrusions extending outwardly therefrom for absorbing energy.

18. The robot of claim 17 in which the protrusions are angled inwardly.

19. The robot of claim 16 in which each wheel is made of an energy absorbing material.

20. The robot of claim 19 in which each wheel includes a rim supported by cells.

21. The robot of claim 16 in which each wheel is configured to increase a moment of inertia of the robot.

22. The robot of claim 21 in which each wheel includes a rim with an inwardly extending ridge.

23. A robot comprising:
a chassis;
a foot extending rearwardly from the chassis along a roll axis of the chassis, and wherein the foot produces a thrust vector in a direction of the roll axis of the chassis;
at least one leg pivotable with respect to the chassis to pitch the chassis upward at a selected launch trajectory angle, wherein the at least one leg is separate from the foot;
a motive subsystem configured to maneuver the chassis in both a right-side up and an upside-down orientation, wherein the motive subsystem includes rotatable wheels;
a measurement subsystem for detecting the attitude of the robot in flight; and
a control subsystem configured to automatically actuate and control the motive subsystem when the robot is airborne and use the rotational inertia of the wheels to control the attitude of robot chassis in flight so that the robot lands in the upside-down orientation.

24. The robot of claim 23 further including a hopping actuator attached to the chassis and configured to launch the robot, wherein the hopping actuator includes the foot.

25. The robot of claim 23 further including a sensor for determining when the robot is airborne and the control subsystem is responsive to said sensor and configured to activate the motive subsystem in response.

26. The robot of claim 23 in which the control subsystem is configured to drive the motive system until the robot chassis is level in flight.

27. The robot of claim 23 in which the control subsystem is configured to apply torque to the motive subsystem in order to cause the robot chassis to rotate towards a desired pitch orientation.

28. The robot of claim 23 in which the chassis defines a pitch axis and the roll axis and the chassis is configured to have a median axis of inertia transverse to the pitch axis.

29. The robot of claim 23 in which each wheel includes protrusions extending outwardly therefrom for absorbing energy.

30. The robot of claim 23 in which the protrusions are angled inwardly.

31. A robot deployment method comprising:
maneuvering, by a controller, the robot to a launch location by driving a robot motive subsystem, wherein the robot includes a chassis;
elevating one side of the robot; and
launching the robot by activating a hopping actuator, wherein the hopping actuator includes a foot extending rearwardly from the chassis along a roll axis of the chassis, wherein the foot produces a thrust vector in a direction of the roll axis of the chassis, and wherein the robot includes at least one leg that is separate from the foot.

32. The method of claim 31 further including automatically controlling the attitude of the robot in flight.

33. The method of claim 32 including the step of automatically leveling the robot in flight.

34. The method of claim 33 in which leveling the robot in flight includes controlling the motive subsystem of the robot.

35. The method of claim 31 further including adjusting the orientation of the robot in flight.

36. The method of claim 35 including driving the motive subsystem of the robot in order to cancel pitch rotation of the robot.

37. The method of claim 31 further including the step of configuring the robot chassis to have a median axis of inertia transverse to a chassis pitch axis.

38. A robot deployment method comprising:
maneuvering, by a controller, the robot to a launch location by driving a robot motive subsystem, wherein the motive subsystem includes rotatable wheels;
launching the robot from a right-side up orientation by activating a hopping actuator, wherein the hopping actuator includes a foot extending rearwardly along a roll axis of a chassis of the robot, wherein the foot produces a thrust vector in a direction of the roll axis of the chassis, and wherein the robot includes at least one leg that is separate from the foot; and
controlling the attitude of the robot in flight using rotational inertia of the wheels so that the robot lands in an upside-down orientation.

39. The method of claim 38 further including the step of elevating one side of the robot prior to launching the robot.

40. The method of claim 38 including the step of leveling the robot in flight.

41. The method of claim 40 in which leveling the robot in flight includes applying torque to the motive subsystem.

42. The method of claim 38 further including adjusting the orientation of the robot in flight.

43. The method of claim 38 including applying torque to the motive subsystem.

44. The method of claim 38 further including the step of configuring the robot chassis to have a median axis of inertia transverse to a chassis pitch axis.

* * * * *